(12) United States Patent
Katayama

(10) Patent No.: US 7,551,210 B2
(45) Date of Patent: Jun. 23, 2009

(54) IMAGE DATA TRANSFER METHOD, DIGITAL CAMERA, AND PROGRAM

(75) Inventor: Takeshi Katayama, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 586 days.

(21) Appl. No.: 10/252,106

(22) Filed: Sep. 23, 2002

(65) Prior Publication Data

US 2003/0058343 A1 Mar. 27, 2003

(30) Foreign Application Priority Data

Sep. 26, 2001 (JP) ............................. 2001-294231

(51) Int. Cl.
*H04N 5/76* (2006.01)
*H04N 5/232* (2006.01)

(52) U.S. Cl. ..................... 348/231.3; 348/231.99; 348/211.2

(58) Field of Classification Search .............. 348/207.1, 348/211.2, 231.99, 231.2–231.7
See application file for complete search history.

(56) References Cited

U.S. PATENT DOCUMENTS

| | | | | |
|---|---|---|---|---|
| 5,806,005 A | * | 9/1998 | Hull et al. | 455/566 |
| 5,852,467 A | * | 12/1998 | Ogino | 348/231.1 |
| 5,917,542 A | * | 6/1999 | Moghadam et al. | 348/231.99 |
| 6,229,566 B1 | * | 5/2001 | Matsumoto et al. | 348/231.2 |
| 6,337,712 B1 | | 1/2002 | Shiota et al. | |
| 6,628,325 B1 | * | 9/2003 | Steinberg et al. | 348/211.1 |
| 6,629,104 B1 | * | 9/2003 | Parulski et al. | 707/102 |
| 6,741,864 B2 | * | 5/2004 | Wilcock et al. | 455/456.1 |
| 6,784,924 B2 | * | 8/2004 | Ward et al. | 348/207.1 |
| 6,812,962 B1 | * | 11/2004 | Fredlund et al. | 348/231.2 |
| 6,833,861 B2 | * | 12/2004 | Matsumoto et al. | 348/207.2 |
| 6,967,675 B1 | * | 11/2005 | Ito et al. | 348/207.1 |
| 7,034,880 B1 | * | 4/2006 | Endsley et al. | 348/333.11 |
| 7,116,361 B2 | * | 10/2006 | Baron | 348/231.1 |
| 7,117,519 B1 | * | 10/2006 | Anderson et al. | 725/105 |
| 7,119,818 B2 | * | 10/2006 | Takiguchi | 715/764 |
| 7,133,893 B2 | * | 11/2006 | Goldstein | 709/203 |
| 2002/0101519 A1 | * | 8/2002 | Myers | 348/232 |
| 2002/0196344 A1 | * | 12/2002 | McIntyre et al. | 348/207.1 |
| 2003/0011684 A1 | * | 1/2003 | Narayanaswami et al. | 348/207.99 |
| 2003/0030731 A1 | * | 2/2003 | Colby | 348/231.3 |

FOREIGN PATENT DOCUMENTS

| | | |
|---|---|---|
| EP | 944240 A2 * | 9/1999 |
| JP | 9-116657 | 5/1997 |
| JP | 10-150523 | 6/1998 |
| JP | 2000-184324 | 6/2000 |

\* cited by examiner

*Primary Examiner*—David L Ometz
*Assistant Examiner*—Kelly L Jerabek
(74) *Attorney, Agent, or Firm*—Sughrue Mion, PLLC

(57) ABSTRACT

When image data recorded in a recording medium by a digital camera are sent to a data storing apparatus and stored therein, the image data can be classified according to a user or a digital camera. The image data are recorded in the recording medium by photography with the digital camera. In the case where free space of the recording medium has been consumed, the image data are sent to a DPE store via a mobile phone and stored in a server therein. A controller of the digital camera 1 adds ID information such as user ID or digital camera ID to the image data at the time of transfer of the image data. The DPE store stores the image data by classifying the image data in a user directory in the server according to the ID information added to the image data.

19 Claims, 11 Drawing Sheets

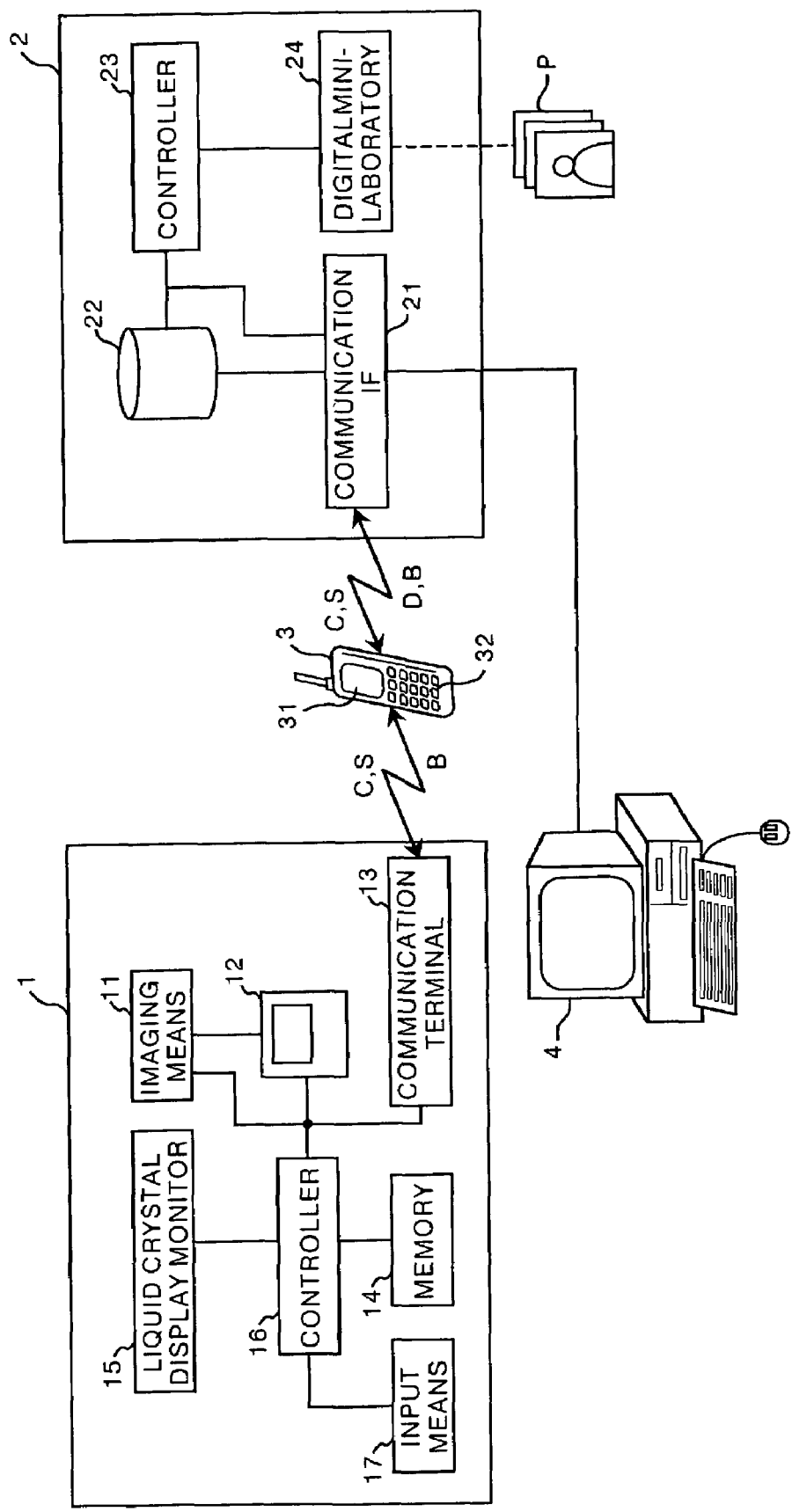

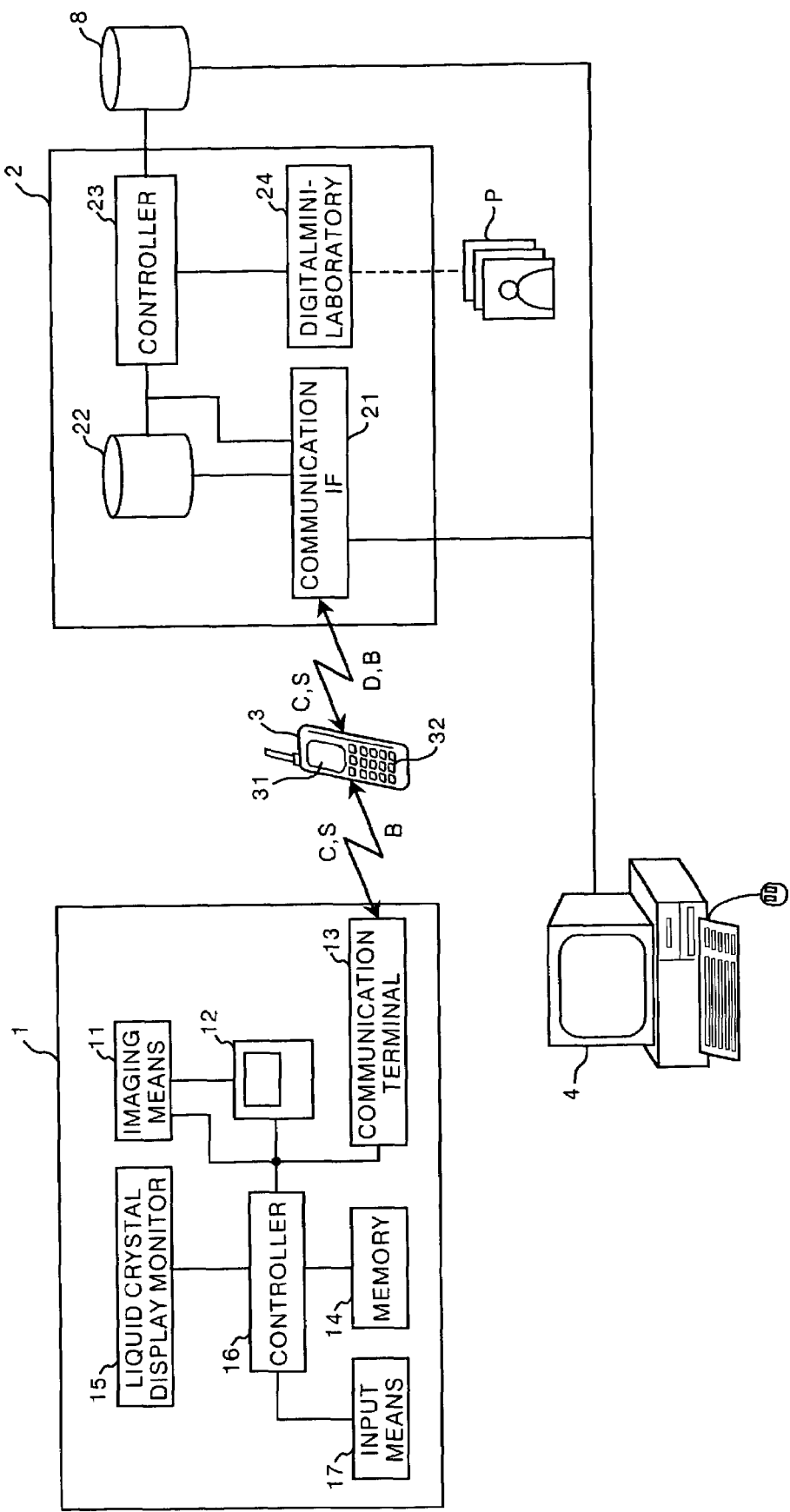

IMAGE DATA TRANSFER METHOD, DIGITAL CAMERA, AND PROGRAM

BACKGROUND OF THE INVENTION

1. Field of the Invention

The present invention relates to an image data transfer method for sending image data obtained by a digital camera and recorded in a recording medium to data storage means installed in a DPE store or the like. The present invention also relates to a digital camera and a program that causes a computer to execute the image data transfer method.

2. Description of the Related Art

Image data obtained by a digital camera are recorded in a portable recording medium such as an IC memory, a Memory Stick, and a Smart Media. Since a recording medium has limited capacity, a plurality of recording media is used for storing a large amount of image data, which is costly. Furthermore, in some cases, a recording medium cannot be taken out from an inexpensive digital camera. Therefore, such a digital camera can photograph only a small number of images.

For this reason, a method of storing image data in an external data storing apparatus installed in a DPE store or the like by sending the image data via a communication line has been proposed. Furthermore, a digital camera enabling data erasure has also been proposed (Japanese Unexamined Patent Publication No. 2000-184324). In this camera, image data recorded in a recording medium are erased or a property thereof is changed to enable erasure after sending the image data to a data storing apparatus via a communication line. According to such a digital camera, free space of a recording medium can be increased by deleting image data from the recording medium after sending the image data to a data storing apparatus when the free space becomes small. In this manner, more image data can be obtained by photography with the recording medium.

Image data sent from the digital camera described in Japanese Unexamined Patent Publication No. 2000-184324 are stored in a data storing apparatus. However, the image data are not classified according to users who requested image data storage or according to digital cameras. Therefore, when the image data are downloaded from the data storing apparatus, an access to the image data is troublesome.

SUMMARY OF THE INVENTION

The present invention has been conceived based on consideration of the above circumstances. An object of the present invention is therefore to classify image data according to users or digital cameras in a data storing apparatus that stores the image data sent thereto.

An image data transfer method of the present invention is a method of sending image data recorded in a recording medium by a digital camera communicable with data storage means to the data storage means that has a function of remote communication, and the image data transfer method comprises the steps of:

adding ID information for identifying an owner of the digital camera to the image data; and sending the image data added with the ID information to the data storage means.

The ID information can be any kind of information enabling identification of the owner of the digital camera. More specifically, an ID of a user who is the owner of the digital camera or a digital camera ID for identifying the digital camera can be used as the ID information.

The ID information is added to the image data so as to unify the ID information with the image data. For example, the ID information is recorded in tag information of the image data, or related to the image data.

Communication between the digital camera and the data storage means may be carried out via a communication terminal such as a mobile phone. In this case, it is preferable for the communication between the digital camera and the data storage means to be carried out according to a short-distance network communication method such as Bluetooth for connecting a plurality of digital devices in a wireless manner. In this manner, even in the case where the user has a plurality of digital cameras, only one communication line is necessary for image data transfer, which reduces a burden on the user.

A digital camera of the present invention is a digital camera communicable with data storage means that has a remote communication function. The digital camera comprises transfer means for sending image data recorded in a recording medium to the data storage means. The transfer means adds ID information for identifying an owner of the digital camera to the image data and sends the image data added with the ID information to the data storage means.

The image data transfer method of the present invention may be provided as a program that causes a computer to execute the image data transfer method.

According to the present invention, the ID information for identifying the owner of the digital camera is added to the image data and sent to the data storage means. Therefore, the data storage means can store the image data by classifying the image data according to the user or the digital camera, with reference to the ID information. Consequently, the owner of the digital camera can easily refer to the image data he/she wants by using the ID information after accessing the data storage means.

BRIEF DESCRIPTION OF THE DRAWINGS

FIG. 1 is a block diagram showing a configuration of an image data transfer system adopting a digital camera of a first embodiment of the present invention;

FIG. 12 is a block diagram showing a configuration of an image data transfer system adopting a digital camera of a third embodiment of the present invention.

DESCRIPTION OF THE PREFERRED EMBODIMENTS

Figure 2A:
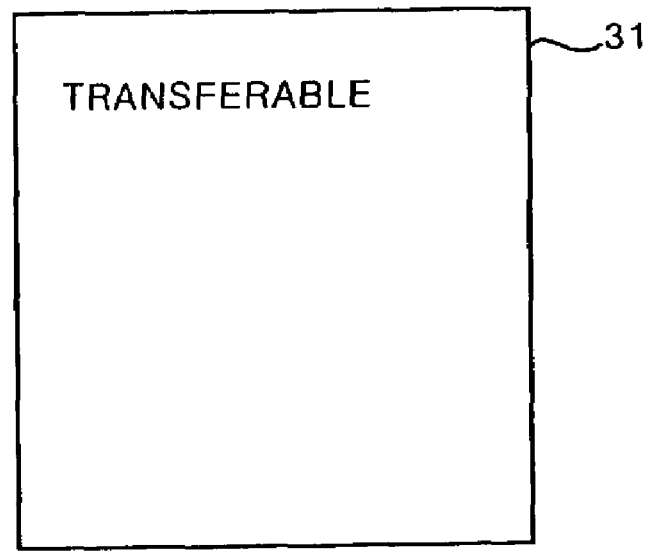
FIGS. 2A and 2B show information displayed on a mobile phone.

Hereinafter, embodiments of the present invention will be explained with reference to the accompanying drawings. FIG. 1 is a block diagram showing an image data transfer system adopting a digital camera of a first embodiment of the present invention. As shown in FIG. 1, the image data transfer system in this embodiment exchanges data between a DPE store 2 and a digital camera 1, a mobile phone 3, and a personal computer 4 owned by a user.

The digital camera 1 comprises imaging means 11 having a lens, CCDs, a shutter, and an image data recording unit for recording image data sets S obtained by photography in a recording medium 12 for the digital camera 1, a wireless communication terminal 13 for carrying out short-distance communication with the mobile phone 3, a memory 14 that stores a program for controlling ID information representing a user ID or an ID of the digital camera 1, a liquid crystal display (LCD) monitor 15 for image display or the like, controller 16 for controlling the imaging means 11, the communication terminal 13, and the LCD monitor 15, and input means 17 such as ten keys for carrying out various kinds of input. The communication terminal 13 and the controller 16 correspond to transfer means.

The communication terminal 13 communicates with the mobile phone 3 by using a short-distance network communication method such as Bluetooth for connecting a plurality of digital devices to each other.

The user inputs an instruction to transfer the image data sets S by using the input means 17 in the case where free space of the recording medium 12 has become small or has been fully used. At this time, the image data sets S stored in the recording medium 12 may all be sent. However, the user may select the image data sets S to be sent, by viewing the image data sets S displayed on the LCD monitor 15. Alternatively, the controller 16 may monitor the free space of the recording medium 12 so that the controller 16 can automatically send the image data sets S in the case where the free space has been fully used or has become smaller than a predetermined size.

The user may be notified of a necessity for image data transfer in the case where the free space has been fully used or has become smaller than the predetermined size. In this case, the user is notified of the necessity by display on the LCD monitor 15 or a chime, for example. Alternatively, the digital camera 1 may notify the mobile phone 3 of the necessity by using the communication terminal 13 so that the mobile phone 3 can notify the user of the necessity according to a predetermined method such as ringing, vibration, or flashing a lamp. It is preferable in this case for the necessity to be displayed on an LCD monitor 31 of the mobile phone 3.

The controller 16 reads the ID information stored in the memory 14 and adds the ID information to the image data sets S as tag information thereof, when the image data sets S are transferred. The ID information may be sent as a file separate from the image data sets S while being related to the image data sets S.

The controller 16 calculates the total size of the image data sets S to be transferred, and generates size information C representing the total size. The controller 16 then sends the size information C and the ID information to the DPE store 2 via the mobile phone 3, before sending the image data sets S. The DPE store 2 receives the size information C and sends information D for various kinds of processing to the mobile phone 3, as will be explained later.

The mobile phone 3 receives the information D and carries out display corresponding to the information D on the LCD monitor 31 thereof, as will be explained later. The mobile phone 3 displays on the LCD monitor 31 a proportion (%) of the image data sets S that have been sent to the image data sets S to be sent, and the expected transfer completion time, for example.

The DPE store 2 sends to the digital camera 1 via the mobile phone 3 confirmation information B representing the fact that the image data sets S have been normally stored, as will be explained later. When the digital camera 1 receives the confirmation information B, an Archive property of the image data sets S stored in the recording medium 12 is set OFF.

The Archive property is a flag of file properties. When a file is newly generated or the content thereof is changed, the Archive property thereof is automatically set ON. Setting the Archive property ON refers to the fact that the file needs backup. Therefore, in the case where the Archive property is OFF, the file has already been backed up and may be deleted.

The DPE store 2 comprises a communication IF (Interface) 21 for receiving the image data sets S, a server 22 for storing the image data sets S, a controller 23 for controlling the communication IF 21 and the server 22, and a digital mini-laboratory 24 for obtaining prints by printing the image data sets S.

The communication IF 21 has a function of remote communication for sending and receiving various kinds of data and information by using a wireless connection.

The controller 23 has a personal computer and a printer, and controls and manages the communication IF 21 and the server 22. The controller 23 stores the image data sets S sent from the digital camera 1 via the mobile phone 3 in the server 22 while classifying the image data sets S according to the ID information added thereto. The server 22 has a directory for each user (hereinafter referred to as the user directory) and the image data sets S are stored in the user directory corresponding to the ID information, with reference to the ID information added to the image data sets S. In the case where the ID information represents the ID of the digital camera 1, a directory may be generated for each digital camera.

The user directory has capacity according to a charge therefor (1000 yen per 100 MB each month, for example). Therefore, the controller 23 compares free space of the user directory corresponding to the ID information with the size of the image data sets S sent thereto, based on the size information C sent from the digital camera 1 via the mobile phone 3 and the ID information sent before transmission of the image data sets S. The controller 23 sends the information D in accordance with a result of the comparison to the mobile phone 3.

In this embodiment, the information D includes: (1) information representing the fact that the image data sets S can be stored in the user directory if the free space is large enough for storing all the image data sets S to be sent, or (2) information representing a size of space necessary for storing all the image data sets S if all the image data sets S cannot be stored. The information D also includes information for causing the user to carry out processing according to the either case described above. If the information D includes the information for the case (1), all the image data sets S can be sent. Therefore, the information D includes information for displaying a message "Transferable". In the case (2) above, the information D includes information notifying the size of necessary space, and information for displaying commands to carry out the various kinds of processing that will be explained later.

The mobile phone 3 carries out various kinds of display on the LCD monitor 31 for causing the user to carry out the processing based on the information D. For example, if the information D includes the information for the case (1), the message "Transferable" is displayed as shown in FIG. 2(a).

The user confirms the message and can carry out transfer of the image data sets S by operating operation buttons 32 of the mobile phone 3.

Meanwhile, if the information D includes the information for the case (2), the size of necessary space is displayed as shown in FIG. 2. At the same time, the commands "Cancel Transfer", "Delete", "Increase Capacity", and "Select" are shown. The command "Cancel Transfer" is to cancel transfer of the image data sets S. The command "Delete" is used for deleting image data sets of the user stored in the user directory in the server 22 (hereinafter referred to as the image data sets Ss). The command "Increase Capacity" is to carry out processing for increasing the size of the user directory by payment of an additional charge. The command "Select" is used for carrying out processing to reselect the image data sets S to be sent, in order to send the image data sets S having the size that can be stored in the server 22 by decreasing the total size of the image data sets S to be sent. The user selects a desired one of the commands and causes the digital camera 1, the DPE store 2 and/or the mobile phone 3 to carry out the processing corresponding to the selected command. The user can inverse the display of the desired command and select the command by using the operation buttons 32 of the mobile phone 3.

In the case where the command "Cancel Transfer" has been selected, information representing the cancellation is sent from the mobile phone 3 to the DPE store 2. In the DPE store 2, the controller 23 cancels the processing. In the case where the command "Delete" has been selected, information representing the deletion is sent from the mobile phone 3 to the DPE store 2. In the DPE store 2, the controller 23 deletes the image data sets Ss stored in the user directory in the server 22 in chronological order of the date of photography and saves the free space in the user directory for storing the image data sets S to be sent. In the case where the command "Increase Capacity" has been selected, information representing the capacity increase is sent from the mobile phone 3 to the DPE store 2. In the DPE store 2, the controller 23 increases the capacity of the user directory in the server 22. In this case, the user needs to pay the additional charge for the increased capacity upon payment for the storage of the image data sets S. Therefore, it is preferable for the user to be notified of the additional charge so that the user can confirm the necessity of the additional charge payment.

In the case where the command "Select" has been selected, information indicating the selection is sent to the digital camera 1. Consequently, a selection screen is displayed on the LCD monitor 15 of the digital camera 1, and the user can reselect the image data sets S to be sent while viewing the selection screen. In this manner, the size of the image data sets S to be sent can be decreased. The selection screen may be displayed on the LCD monitor 31 of the mobile phone 3 to cause the user to reselect the image data sets S.

The digital camera 1, instead of the mobile phone 3, may display the message based on the information D and the commands representing the processing so that the user can select the desired command by using the digital camera 1. In this case, the information D sent from the DPE store 2 is sent to the digital camera 1 via the mobile phone 3, and the message or the commands are displayed on the LCD monitor 15. The user can select the desired command by using the input means 17 of the digital camera 1 while viewing the message or the commands displayed thereon.

The operation of the first embodiment will be explained next. FIGS. 3 to 8 are flow charts showing the operation of the first embodiment. The user carries out photography with the digital camera 1 on trip or the like, and records the image data sets S in the recording medium 12. The user requests storage of the image data sets S from the DPE store 2 by sending the image data sets S obtained by the digital camera 1 to the DPE store 2 via the mobile phone 3 in the case where the free space of the recording medium 12 has been consumed or becomes small. After the image data sets S have been stored, the user reduces or deletes the image data sets S recorded in the recording medium 12 in order to increase the free space of the recording medium 12, and continues photography.

As shown in FIG. 1, the digital camera 1 receives selection of the image data sets S to be sent (Step S1). In order to select the image data sets S to be sent, the user operates the input means 17 to sequentially display the image data sets S recorded in the recording medium 12 on the LCD monitor 15, and inputs the selection regarding the image data sets S to be sent by using the input means 17. The image data sets S to be sent may all the image data sets S in the recording medium 12 or only a portion thereof. The ID of the digital camera 1 or the user ID is added to the selected image data sets S as the ID information (Step S2), and the size information C representing the total size of the selected image data sets S is generated after calculation of the total size (Step S3). The IPv6 address of the digital camera 1 may be used as the ID thereof. The communication terminal 13 of the digital camera 1 accesses the mobile phone 3 (Step S4). The digital camera 1 sends to the mobile phone 3 the ID information, the size information C, and the phone number of the DPE store 2 stored in the memory 14 (Step S5).

The mobile phone 3 receives the ID information, the size information C and the phone number (Step S6), and accesses the communication IF 21 of the DPE store 2, based on the phone number of the DPE store 2 (Step S7). The communication between the mobile phone 3 and the communication IF 21 is wireless communication using a public communication channel, and different from the communication between the digital camera 1 and the mobile phone 3. The mobile phone 3 sends to the DPE store 2 the ID information, and the size information C (Step S8). At the time of accessing the DPE store 2 from the mobile phone 3, authentication for the access may be carried out by using the phone number of the mobile phone 3.

The phone number of the mobile phone 3 may be used as the ID information. In this case, the digital camera 1 and the mobile phone 3 do not need to send the ID information at Step S5 and Step S8, respectively.

The DPE store 2 receives the ID information and the size information C (Step S9), and carries out processing for confirming the size of the image data sets Ss stored in the server 22 (Step S10).

Figure 4:
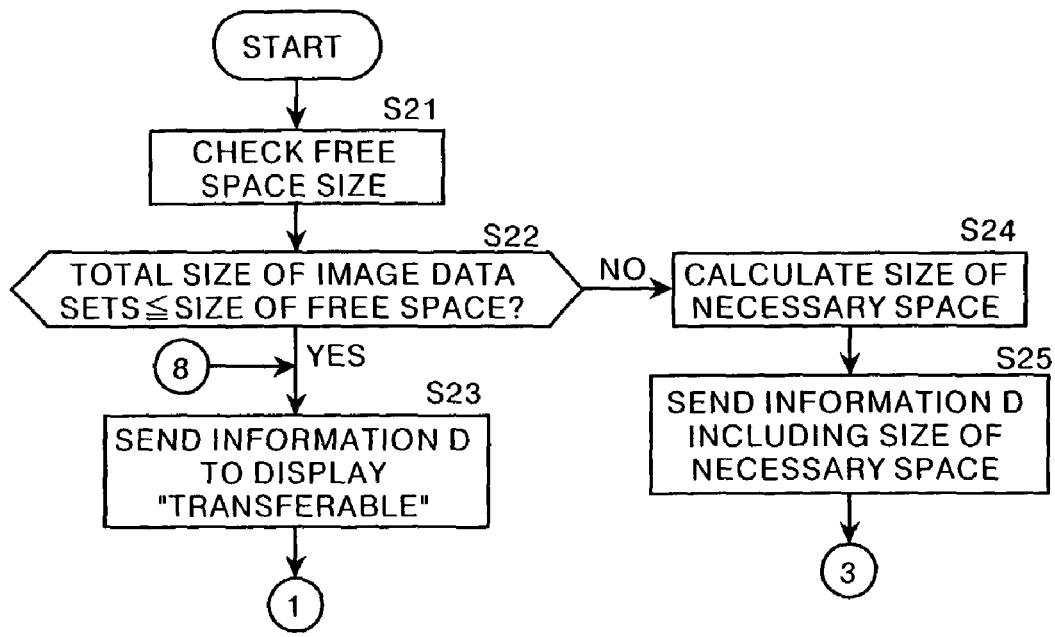
FIG. 4 is a flow chart showing the operation of the first embodiment (part 2)

FIG. 4 is a flow chart showing the processing for data size confirmation. The size of the free space in the user directory corresponding to the ID information is checked, based on the ID information (Step S21). Whether or not the size is equal to or larger than the total size of the image data sets S to be sent is then judged (Step S22). If a result at Step S22 is affirmative, the information D including the information for displaying the message "Transferable" is sent to the mobile phone 3 (Step S23), since all the image data sets S can be stored.

Figure 5:
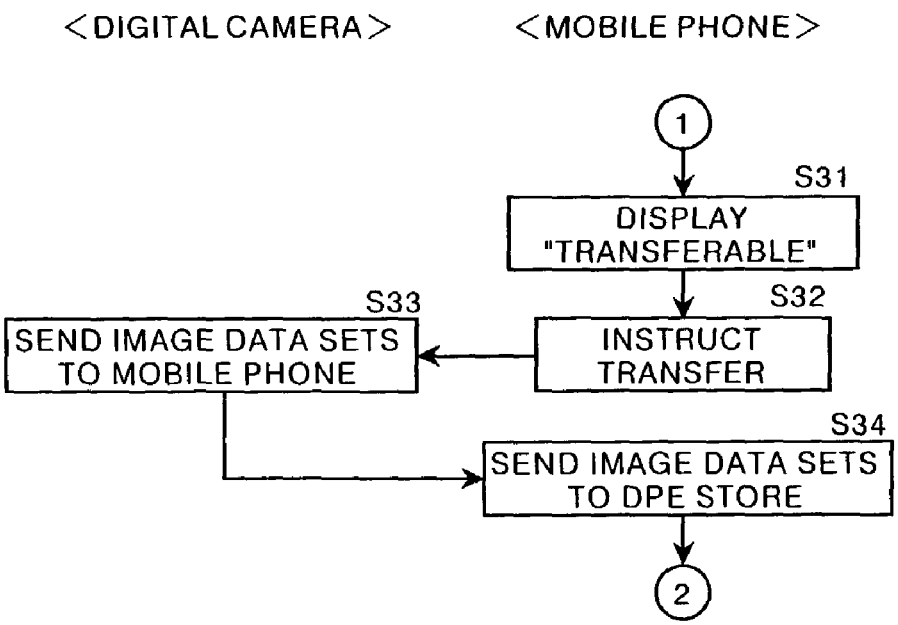
FIG. 5 is a flow chart showing the operation of the first embodiment (part 3)

FIG. 5 is a flow chart showing the processing carried out in the mobile phone 3 and the digital camera 1 when the information D including the message "Transferable" is sent. The mobile phone 3 receives the information D, and the message "Transferable" is displayed on the LCD monitor 31 (Step S31), as shown in FIG. 2A. The user confirms the message and operates the operation buttons 32 of the mobile phone 3 for starting transmission of the image data sets S. In this manner, the user instructs the digital camera 1 to send the image data sets S (Step S32). When the digital camera 1 receives the transmission instruction, the image data sets S are sent to the mobile phone 3 (Step S33). The mobile phone 3 receives the image data sets S and sequentially sends the image data sets S to the DPE store 2 (Step S34).

When the result at Step S22 in FIG. 4 is negative, the size of the space in the user directory necessary for storing the image data sets S is calculated (Step S24), and the calculated size and the commands for the various processing described above are sent to the mobile phone 3 by being included in the information D (Step S25).

Figure 2B:
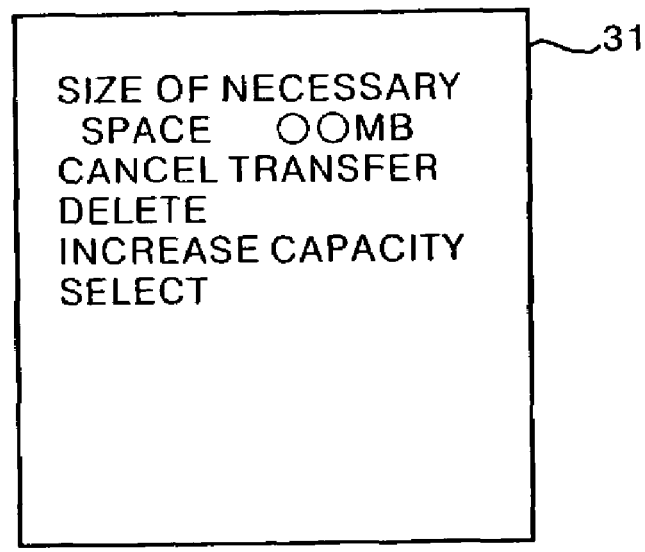
Figure 6:
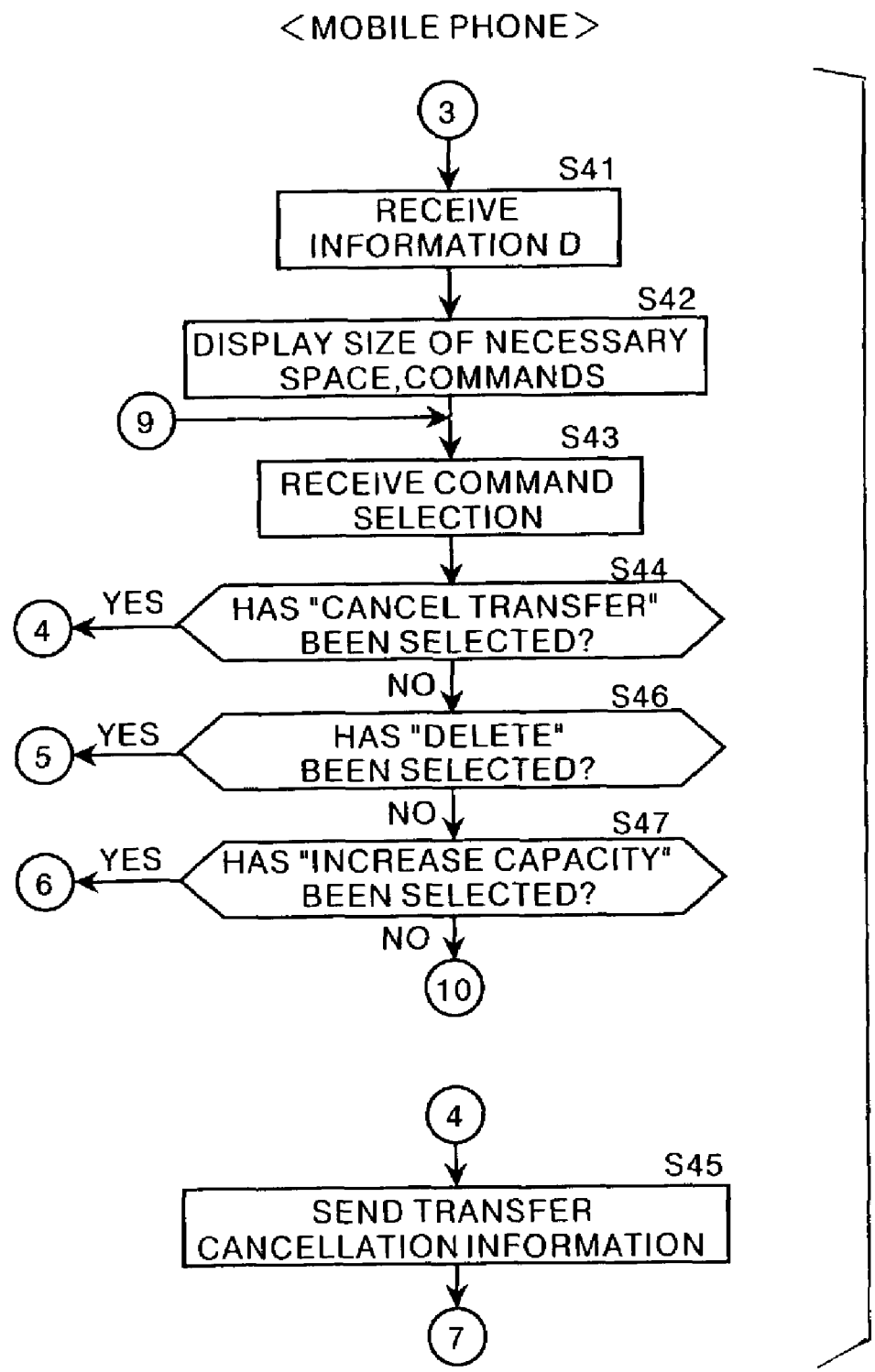
FIG. 6 is a flow chart showing the operation of the first embodiment (part 4)
Figure 7:
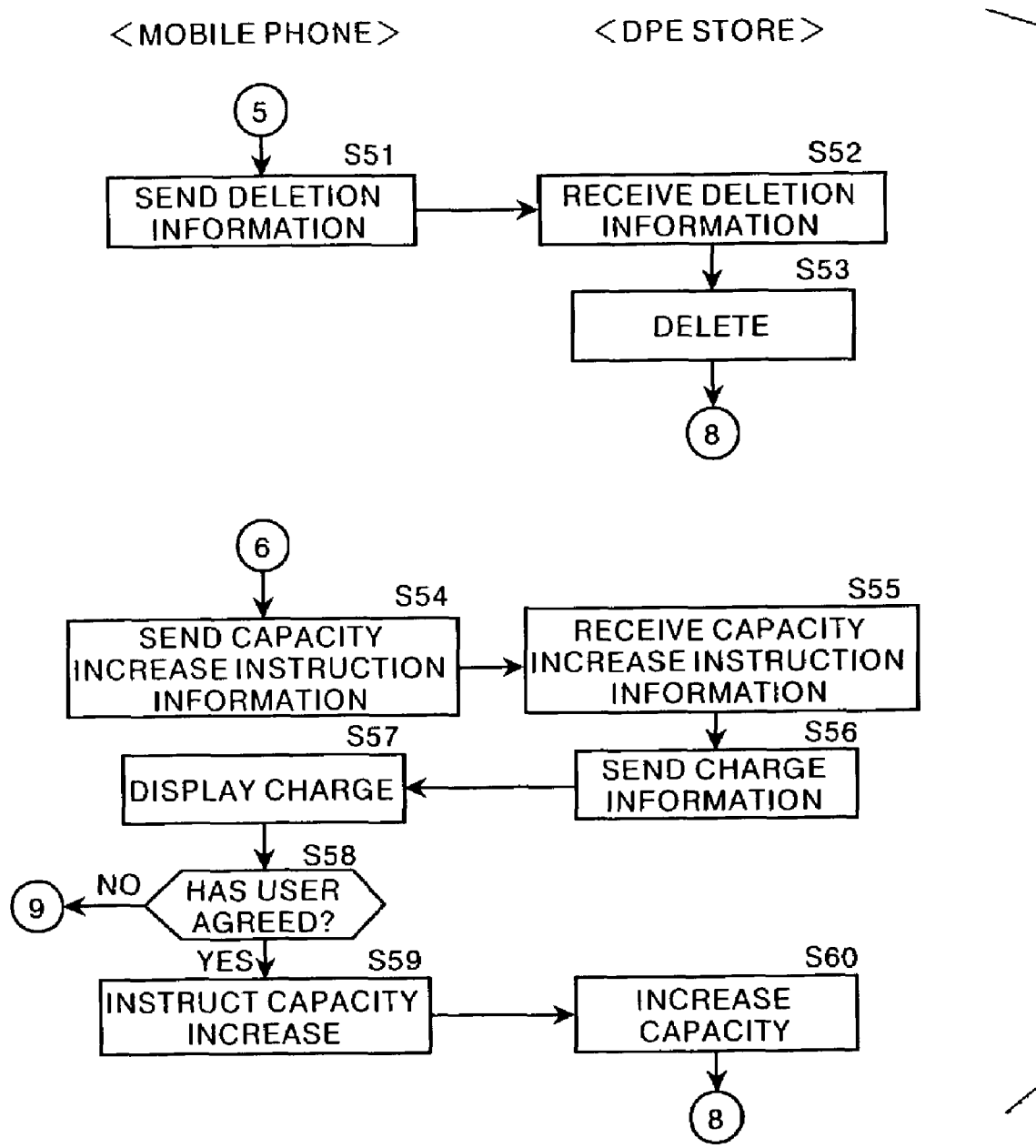
FIG. 7 is a flow chart showing the operation of the first embodiment (part 5)
Figure 8:
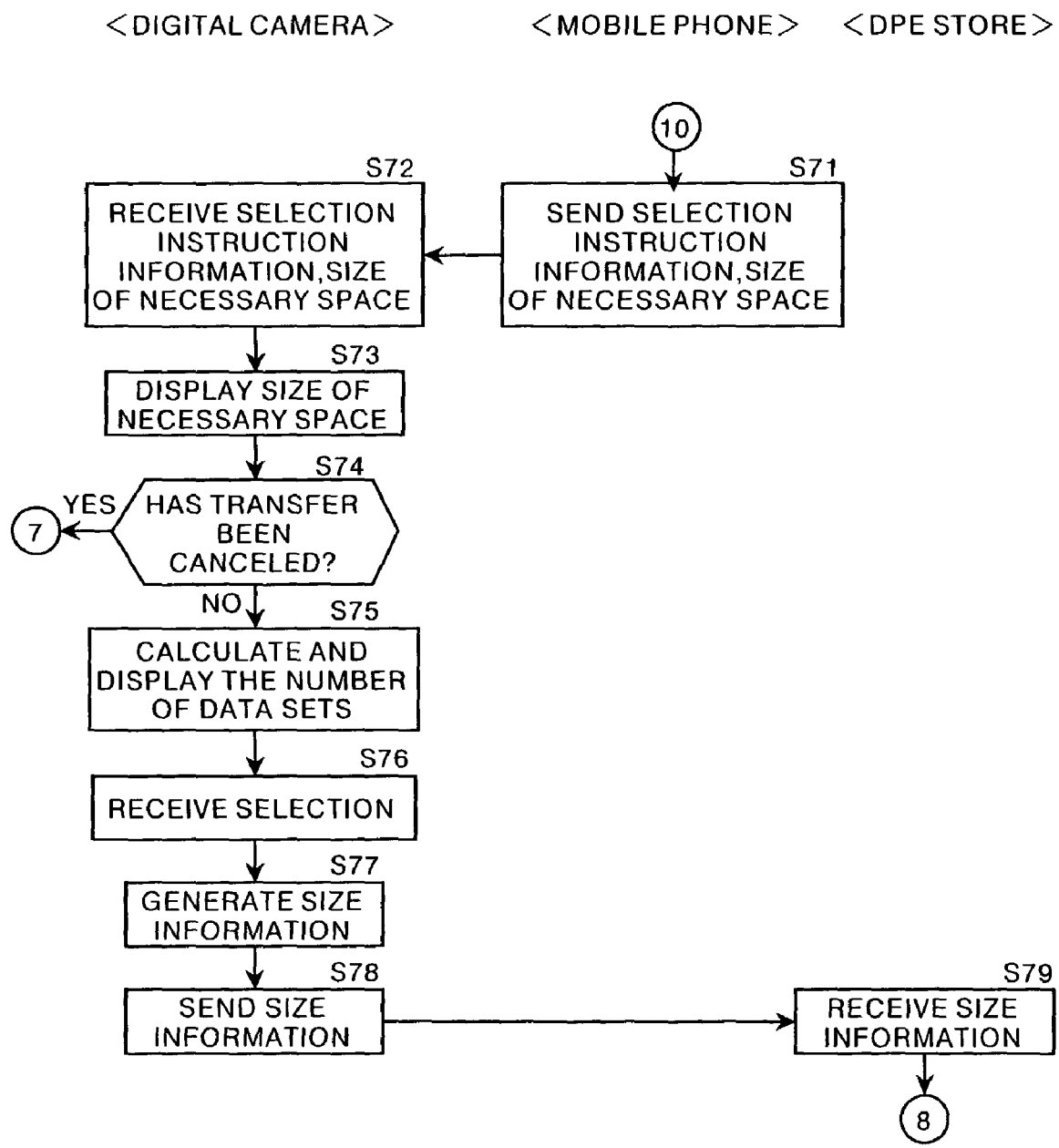
FIG. 8 is a flow chart showing the operation of the first embodiment (part 6)

FIG. 6 is a flow chart showing the processing carried out in the digital camera 1, the DPE store 2, and the mobile phone 3 when the information D is sent at Step S25. The mobile phone 3 receives the information D (Step S41), and the size of necessary space and the commands for carrying out the various processing are shown on the LCD monitor 31 (Step S42), as shown in FIG. 2B.

The selection of the desired command by the user 1 is received (Step S43). Whether or not the command "Cancel Transfer" has been selected is judged (Step S44). If a result at Step S44 is affirmative, the information indicating cancellation of the transfer is sent to the DPE store 2 (Step S45). The procedure returns to the flow chart in FIG. 3, and ends.

If the result at Step S44 is negative, whether or not the command "Delete" has been selected is then judged (Step S46). If a result at Step S46 is affirmative, the information for requesting deletion of the image data sets Ss stored in the server 22 is sent to the DPE store 2 (Step S51), as shown by the flow chart in FIG. 7. The DPE store receives the information for deletion (Step S52), and sequentially deletes the image data sets Ss in the user directory in the server 22 according to the chronological order (Step S53), in order to save the free space that can store the image data sets S to be sent. When the free space is saved, the procedure goes to Step S23 of the flow chart in FIG. 4, and the information D enabling display of the message "Transferable" is sent to the mobile phone 3. The procedure returns to Step S31 and the procedure thereafter in the flow chart shown in FIG. 5 is then carried out.

When the result at Step S46 in FIG. 6 is negative, whether or not the command "Increase Capacity" has been selected is then judged (Step S47). If a result at Step S47 is affirmative, information for instructing capacity increase in the user directory is sent to the DPE store 2 (Step S54), as shown by the flow chart in FIG. 7. The DPE store receives the information of capacity increase instruction (Step S55), and sends charge information representing the additional charge for increasing the capacity of the user directory to the mobile phone 3 (Step S56). The charge information is displayed on the LCD monitor 31 of the mobile phone 3 (Step S57).

If the user inputs agreement to increasing the capacity by paying the additional charge displayed on the LCD monitor 31 (Step S58 YES), the DPE store 2 is instructed to increase the capacity (Step S59). The DPE store 2 increases the capacity of the user directory (Step S60). When the capacity is increased, the procedure goes to Step S23 in the flow chart shown in FIG. 4, and the information D for displaying the message "Transferable" is sent to the mobile phone 3. Thereafter, the procedure from Step S31 in the flow chart in FIG. 5 is carried out. If a result at Step S58 is negative, the procedure returns to Step S43 in the flow chart in FIG. 6, and the procedure thereafter is carried out.

If the result at Step S47 in FIG. 6 is negative, the command "Select" is judged to have been selected. As shown in the flow chart shown in FIG. 8, the DPE store 2 sends to the digital camera 1 selection instruction information for causing the user to select the image data sets S to be sent and the information representing the size of necessary space (Step S71). The digital camera 1 receives the information described above (Step S72), and displays the size of necessary space on the LCD monitor 15 (Step S73). The user confirms the size displayed on the LCD monitor 15, and decides whether the transfer of the image data sets S is canceled or continued. The user inputs the decision by using the input means 17. Whether or not the cancellation has been input is then judged (Step S74). If a result at Step S74 is affirmative, the procedure returns to the flow chart in FIG. 3, and ends. If the result at Step S74 is negative, the number of the image data sets S that can be sent is calculated based on the size of necessary space, and a calculation result is displayed (Step S75). Selection of the image data sets S in accordance with the calculated number is received (Step S76), and the size information C for the image data sets S that have been selected is generated (Step S77). The size information C is sent to the DPE store 2 via the mobile phone 3 (Step S78). The DPE store 2 receives the size information C (Step S79), and the procedure goes to Step S23 in the flow chart shown in FIG. 4. The information D enabling display of the message "Transferable" is then sent to the mobile phone 3 and the procedure returns to Step S31 in the flow chart shown in FIG. 5.

Figure 3:
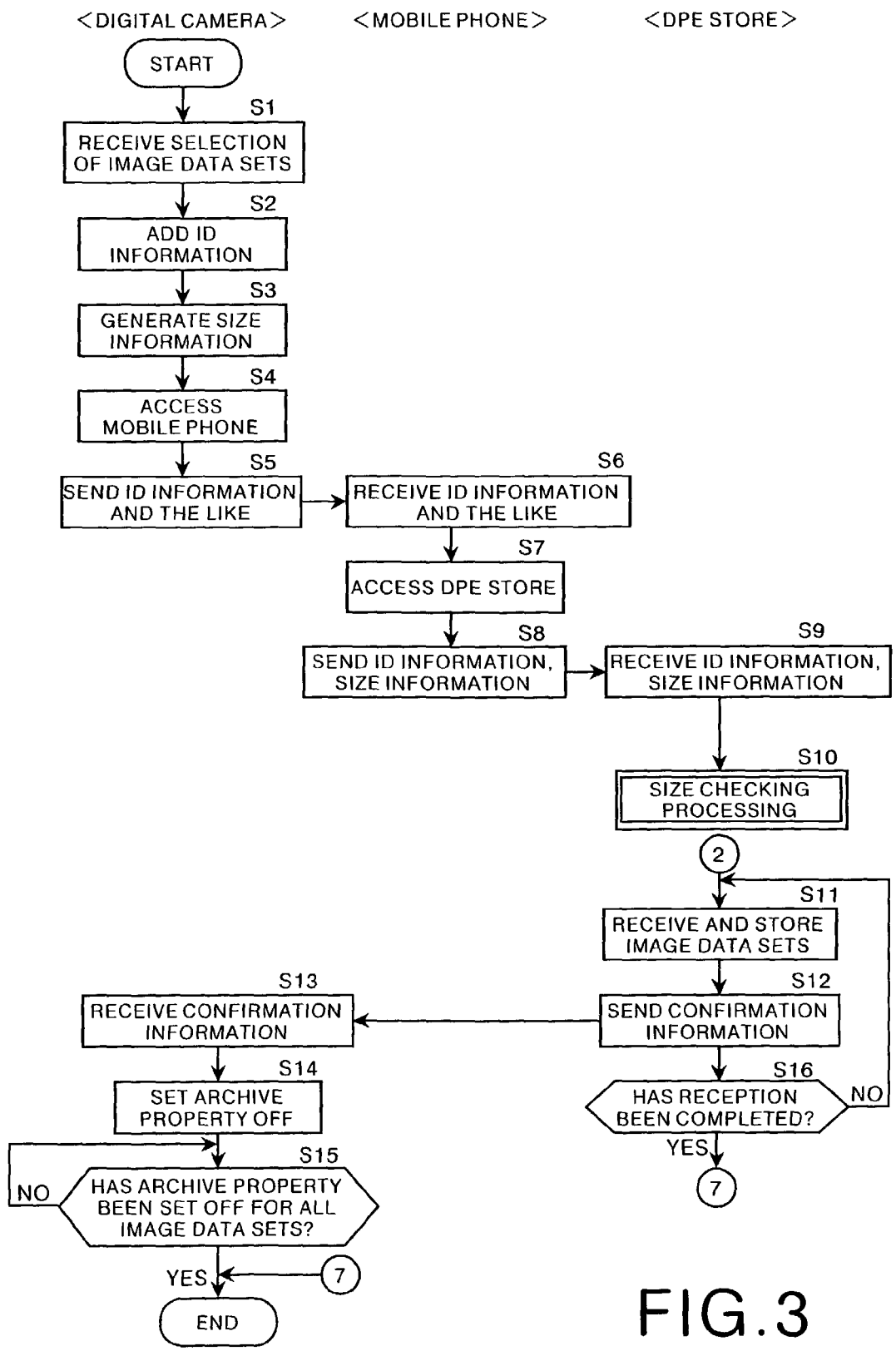
FIG. 3 is a flow chart showing the operation of the first embodiment (part 1)

When the image data sets S are sent from the digital camera 1, the DPE store 2 sequentially receives the image data sets S and stores the image data sets S in the server 22 (Step S11 in the flow chart shown in FIG. 3). Based on the ID information added to the image data sets S, the image data sets S are stored in the user directory corresponding to the ID information.

The confirmation information B representing the fact that the image data sets S have been normally stored in the server 22 is sent to the digital camera 1 via the mobile phone 3 (Step S12). The digital camera 1 receives the confirmation information B (Step S13), and sets the Archive property OFF regarding the image data sets S that have been sent (Step S14). Whether or not the Archive property has been set OFF for all the image data sets S that have been sent is then judged (Step S15). If a result at Step S15 is affirmative, the procedure ends.

Meanwhile, whether or not all the image data sets S have been received is then judged (Step S16), after Step S12. If a result at Step S16 is negative, the image data sets S are further received and stored. If the result at Step S16 is affirmative, the procedure ends.

It is preferable for a communication error to be detected by using a checksum method or the like, during the transfer of the image data sets S. The communication error detection may be carried out for the communication between the digital camera 1 and the mobile phone 3 and between the mobile phone 3 and the DPE store 2. Alternatively, the error check may be carried out for communication between the digital camera 1 and the DPE store 2. In the case where a communication error has been detected, the transfer is retried for up to a predetermined number of times. If the trial reaches the predetermined number, the transfer ends. Alternatively, the user can select further retry.

In many cases, a communication condition improves by changing a place of transmission. For this reason, in the case where the transfer has been stopped due to the error and communication becomes more reliable by changing the place, the user restarts transfer of the image data sets S whose transfer has been suspended due to the error. In the case where the user stops the transfer due to the error, information of whether or not the transfer has been carried out is stored for all the image data sets S, and only the image data sets S whose transfer has not been carried out are sent by restarting the transfer. In this case, the Archive property of each of the image data sets S in the recording medium 12 is set OFF after completion of transfer thereof. In this manner, whether or not the transfer has been carried out can be judged by checking the Archive property.

Figure 9:
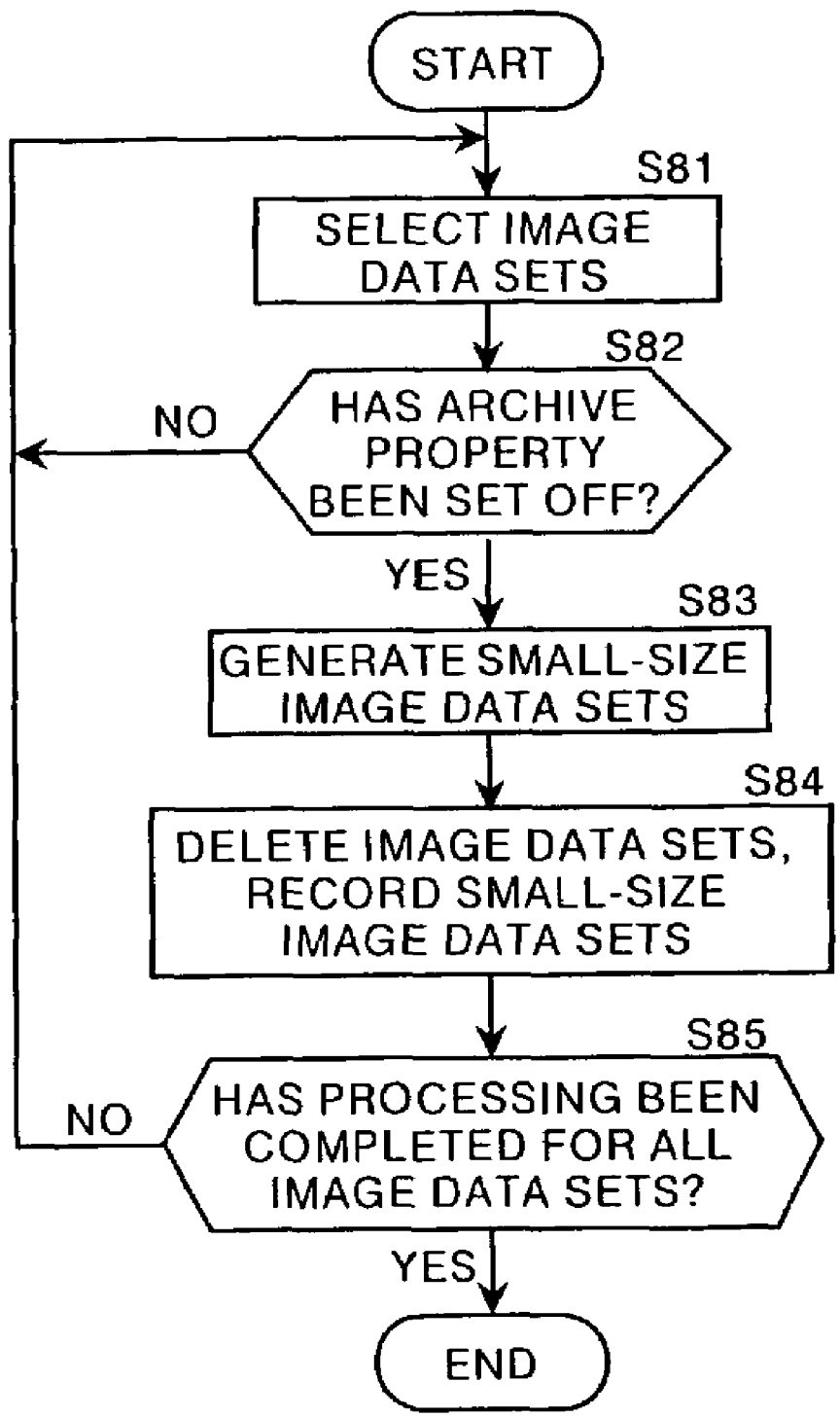
FIG. 9 is a flow chart showing processing carried out in the digital camera (part 1)

Thereafter, the following procedure is carried out in the digital camera 1. FIG. 9 is a flow chart showing the procedure carried out in the digital camera 1. First, one of the image data sets S stored in the recording medium 12 is selected (Step S81), and whether or not the Archive property thereof is OFF is judged (Step S82). If a result at Step S82 is affirmative, the image data set S is subjected to processing to reduce the size thereof, and a small-size image data set S is generated (Step S83). The small-size image data set may represent an image reduced from an image represented by the image data set S. Alternatively, the small-size image data set S may have a higher compression rate.

If the result at Step S82 is negative, the procedure returns to Step S81 for further selection of the image data set S. The image data set S whose small-size data set has been generated is deleted from the recording medium 12, and the small-size image data set is recorded in the recording medium 12 instead. Whether or not the procedure from Step S81 to Step S84 has been carried out for all the image data sets S in the recording medium 12 is then judged (Step S85). If a result at Step S85 is affirmative, the procedure ends. If the result at Step S85 is negative, the procedure returns to Step S81 for further selection of the image data set S. The procedure from Step S81 to Step S85 is then repeated.

The small-size image data sets have a smaller data size than the image data sets S. Therefore, by recording the small-size image data sets in the recording medium 12 instead of the image data sets S, the free space of the recording medium 12 can be saved. Consequently, the user can continue photography and can newly record image data sets in the recording medium 12. Since the recording medium 12 stores the small-size image data sets of the image data sets S that have been sent to the DPE store 2, the image data sets S stored in the server 22 can be easily confirmed by referring to the small-size image data sets.

In the case where the image data sets S are of Exif file format and added with thumbnail image data sets, the thumbnail image data sets may be used as the small-size image data sets. In this case, only the thumbnail image data sets S are stored in the recording medium 12 by deleting the image data sets S but not deleting the thumbnail image data sets.

The processing for reducing the size of the image data sets S may be carried out according to an instruction from the mobile phone 3. Alternatively, the image data sets S may be displayed on the LCD monitor 15 or 31 of the digital camera 1 or the mobile phone 3 so that the procedure can be carried out with the user confirming the content of the image data sets S.

Figure 10:
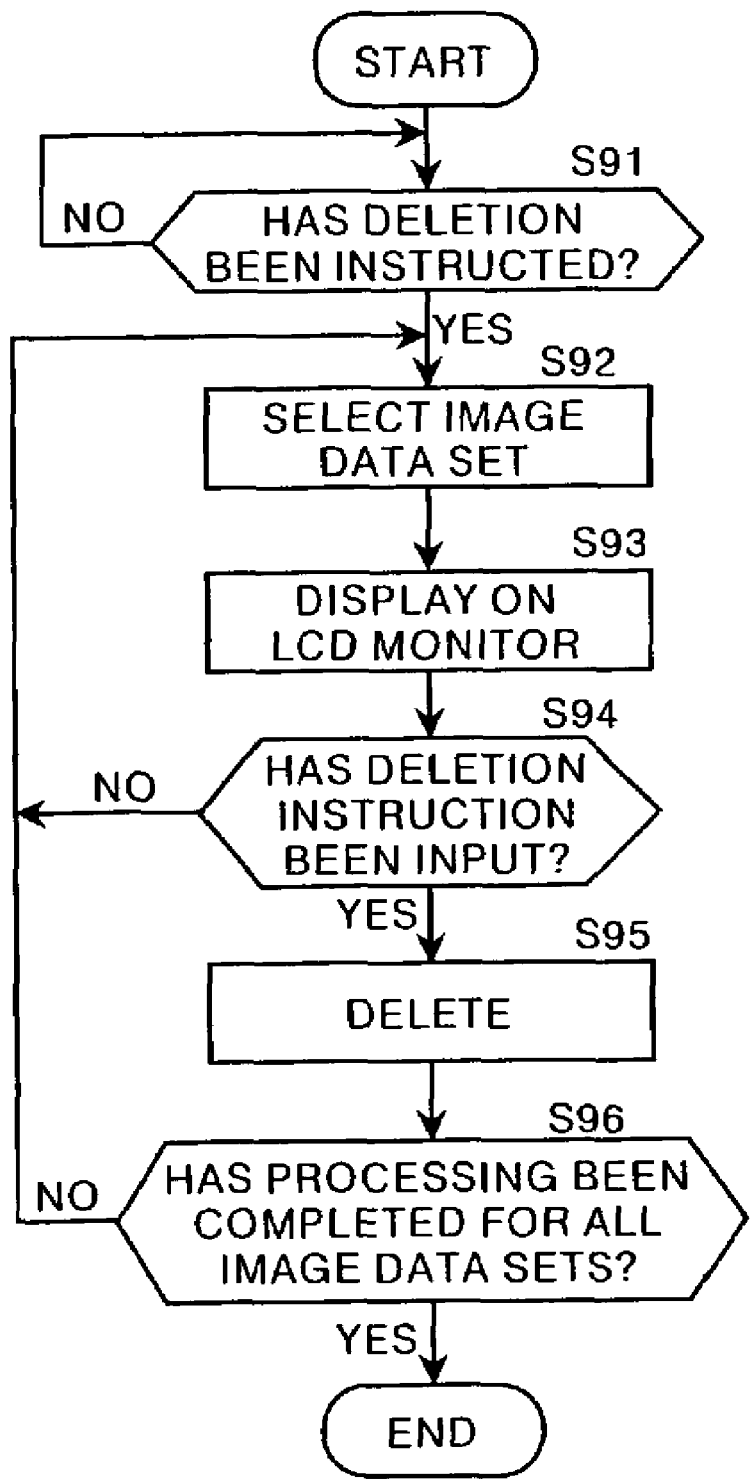
FIG. 10 is a flow chart showing processing carried out in the digital camera (part 2)

The following procedure may be carried out in the digital camera 1. FIG. 10 is a flow chart showing the procedure carried out in the digital camera 1. First, the user instructs deletion of the image data sets S recorded in the recording medium 12 by using the input means 17 (Step S91). One of the image data sets S stored in the recording medium 12 is selected (Step S92), and displayed on the LCD monitor 15 (Step S93). Whether or not a deletion instruction has been input for the image data set S displayed on the LCD monitor 15 is then judged (Step S94). If a result at Step S94 is affirmative, the image data set S is deleted from the recording medium 12 (Step S95). If the result at Step S94 is negative, the procedure returns to Step S92 for further selection of the image data set S, and the procedure from Step S92 to Step S94 is repeated.

Whether or not the procedure from Step S92 to Step S95 has been carried out for all the image data sets S stored in the recording medium 12 is then judged (Step S96). If a result at Step S96 is affirmative, the procedure ends. If the result is negative, the procedure returns to Step S92 for further selection of the image data set S. The procedure from Step S92 to Step S96 is then repeated.

If the image data sets S are deleted from the recording medium 12 as has been described above, the free space of the recording medium 12 increases in size. Therefore, the user can continue photography to record more image data sets in the recording medium 12. Furthermore, since the image data sets S are displayed on the LCD monitor 15 at the time of deletion thereof, the user can confirm the image data sets Ss that have been stored in the server 22 before deletion. Consequently, the user can memorize the image data sets Ss stored in the server 22, and can easily confirm the image data sets Ss by refreshing his/her memory.

The image data sets S may be deleted by an input of instruction from the mobile phone 3. In this case, the image data sets S are displayed on the LCD monitor 31 of the mobile phone 3 for confirmation of deletion.

The digital camera 1 may automatically delete the image data sets S whose Archive property has been set OFF. In this case, the information for deleting the image data sets S is sent from the DPE store 2 to the mobile phone 3, and the mobile phone 3 transfers the information to the digital camera 1. The digital camera 1 receives the information and deletes the image data sets S from the recording medium 12.

The user can download the image data sets Ss stored in the server 22 to the personal computer 4 by accessing the DPE store 2 from the personal computer 4 at home. The image data sets Ss stored in the server 22 are added with the ID information, and classified in the user directory according to the ID information. Therefore, by sending the ID information from the personal computer 4 to the DPE store 2, the user can easily access the image data sets Ss stored in the user directory in the server 22 and can easily search for the image data sets Ss stored therein.

The ID information and the IP address of the personal computer 4 may be registered with the DPE store 2 in advance. By relating the ID information and the IP address, the user can access the user directory without sending the ID information from the personal computer 4.

In the case where the image data sets S are stored in the server 22 by using the ID of the digital camera 1, the ID information does not need to be input from the personal computer 4 if the ID information is sent to the personal computer 4 by using a short-distance network communication method such as Bluetooth and by sending the ID information from the personal computer 4 to the server 22. In this case, the ID information may be sent to the personal computer 4 by connecting the digital camera 1 with the personal computer 4 by a wired connection, such as cradle and USB, instead of Bluetooth.

The DPE store 2 may set the Archive property OFF regarding the image data sets Ss that the user has downloaded. Since the image data sets Ss whose Archive property is OFF have been downloaded to the personal computer 4 of the user, the image data sets Ss can be prevented from being deleted by error, if the user sequentially deletes the image data sets Ss whose Archive property has been set OFF in order to save the free space of the user directory.

As has been described above, in this embodiment, the ID information is added to the image data sets S to be sent to the DPE store 2. Therefore, the server 22 can store the image data sets S by classifying the image data sets S in the user directory according to the ID information. Consequently, the user can easily refer to the image data sets Ss in the server 22 of the DPE store 2 as desired, by using the ID information.

Figure 11:
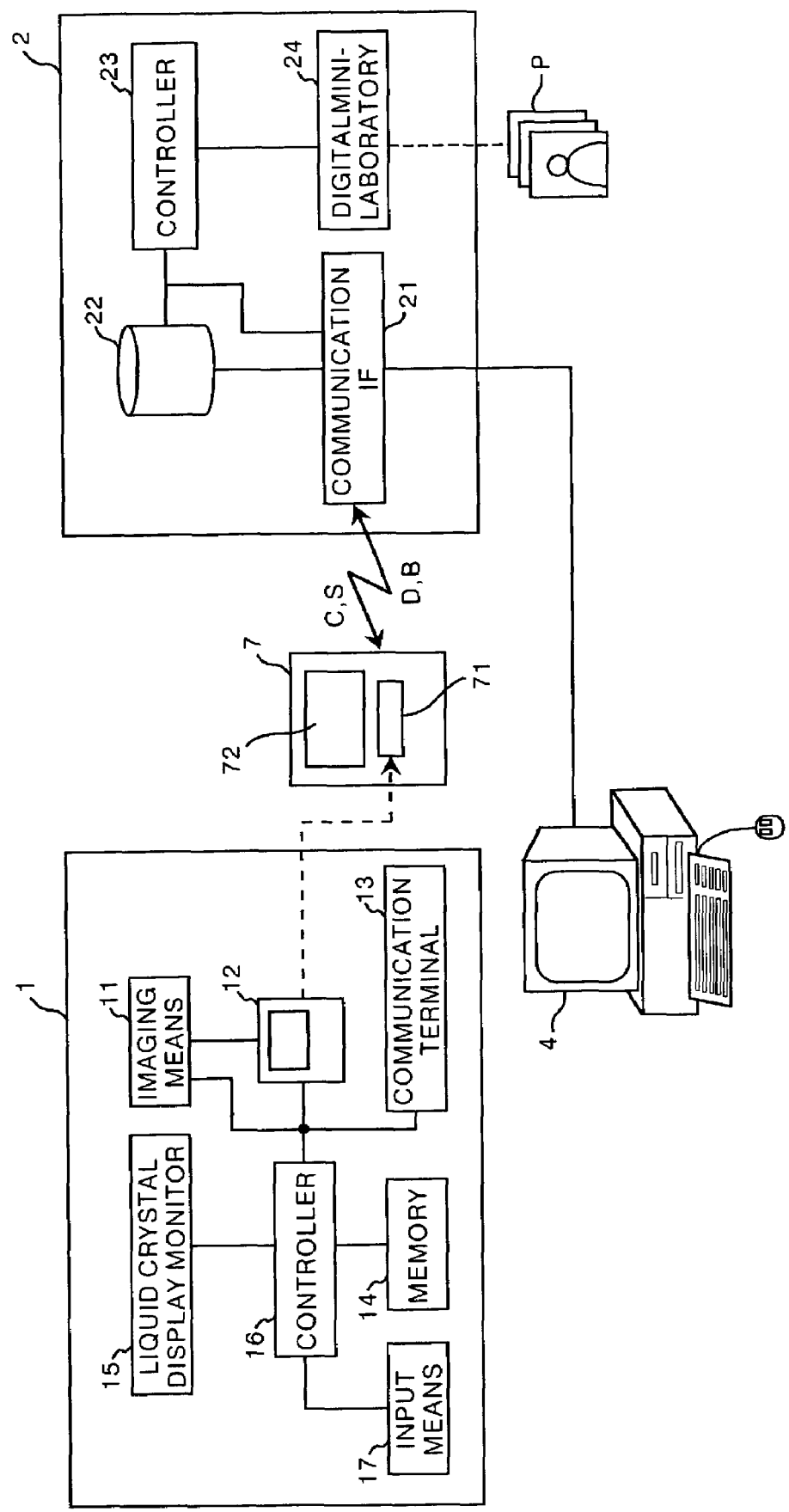
FIG. 11 is a block diagram showing a configuration of an image data transfer system adopting a digital camera of a second embodiment of the present invention.

A second embodiment of the present invention will be explained next. FIG. 11 is a block diagram showing a configuration of an image data transfer system using a digital camera of the second embodiment of the present invention. In the second embodiment, the same elements as in the first embodiment have the same reference numbers and the detailed explanations thereof are omitted. In the second embodiment, a communication terminal 7 installed in a place other than the home of the user is used for communication with the DPE store 2, instead of the mobile phone 3 in the first embodiment.

The communication terminal 7 is installed in a hotel, in a convenience store, or at an event site such as a site for athletics meeting. The communication terminal 7 has a slot 71 for reading the image data sets S from the recording medium 12 and a monitor 72 for carrying out various kinds of display.

In the second embodiment, the user sets the recording medium 12 in the slot 71 of the communication terminal 7 outside his/her home, and instructs transfer of the image data sets S. The image data sets S are then sent to the DPE store 2 and stored in the server 22. In the case where the free space is not large enough, the commands and the message are displayed on the monitor 72, based on the information D sent from the DPE store 2 to the communication terminal 7, as in the first embodiment described above. Once the image data sets S have been sent, the Archive property of each of the image data sets S recorded in the recording medium 12 is set OFF and the image data sets S in the recording medium 12 are subjected to size reduction processing or deletion processing by the digital camera 1.

In the second embodiment, the DPE store 2 that receives the image data sets S sends a processing ID that notifies reception of the image data sets S to the communication terminal 7. The image data sets S are stored in the server 22 by being added with the processing ID. The processing ID is displayed on the monitor 72 of the terminal 7. It is preferable for the communication terminal 7 to print the processing ID to be provided to the user. The user can confirm that the image data sets S have been stored in the server 22 of the DPE store 2 by the processing ID displayed or printed by the communication terminal 7. The user can access the image data sets S or inquire the DPE store 2 about the image data sets S stored in the server 22, by using the processing ID.

In the above embodiments, the image data sets S recorded in the recording medium 12 are sent to the DPE store 2 and stored in the server 22 of the DPE store 2. However, a print order may be placed at the same time as the transfer of the image data sets S. In this case, in the first embodiment, an order screen for inputting a quantity, a size and the like is displayed on the LCD monitor 31 of the mobile phone 3, for each of the image data sets S to be sent. The user generates order information by inputting the quantity and the like by using the operation buttons 32, and sends the order information to the DPE store 2, together with the image data sets S. Meanwhile, in the second embodiment, an order screen is displayed on the monitor 72 of the communication terminal 7, and a quantity, a size, and the like are input from input means that is not shown. In this manner, the order information is generated and sent to the DPE store 2, together with the image data sets S. The digital camera 1 may generate the order information to be sent to the DPE store 2 via the mobile phone 3 or the communication terminal 7.

The DPE store 2 generates a print or prints P (hereinafter referred to as the prints P) by using the digital mini-laboratory 24, based on the order information. The DPE store 2 sends information for displaying the time of delivery to the mobile phone 3 or to the communication terminal 7. In this manner, the user can know when generation of the prints P is completed. Since the communication terminal 7 is installed in an event site or the like, the time of delivery cannot be confirmed later if the time is only displayed on the monitor 72. Therefore, it is preferable for the communication terminal 7 to print the time of delivery to be provided to the user.

In the case where the print order has been placed, the DPE store 2 may generate index image data sets from the image data sets S that have been received so that the index image data sets are sent to the mobile phone 3 or to the communication terminal 7. In the case where the index image data sets are sent to the mobile phone 3, index images represented by the index image data sets may be displayed on the LCD monitor 31 of the mobile phone 3. Alternatively, the index image data sets may be sent to the digital camera 1 via the mobile phone 3 and displayed on the LCD monitor 15 of the digital camera 1. In the case where the index image data sets are sent to the communication terminal 7, the index images may be displayed on the monitor 72 of the communication terminal 7. Alternatively, the communication terminal 7 may have a printer so that the printer can print the index images.

The user visits the DPE store 2 thereafter, and receives the prints P by paying a charge. The prints P may be provided to the user by delivery or mailing. In this case, the user can pay the charge by electronic settlement from his/her bank account or by using his/her credit card.

In the case where the user places the print order by using the communication terminal 7, it is preferable for the user and the processing ID to be authenticated by notification of the processing ID to the DPE store 2 via the mobile phone or the like. The DPE store 2 generates the prints P only in the case where the processing ID and information for identifying the user such as his/her mobile phone number are authenticated.

After the charge for the prints P has been paid, the image data sets S may be sent from the DPE store 2 to a photograph bank 8, as shown by a third embodiment of the present invention in FIG. 12. The photograph bank 8 stores the image data sets S. In this case, the user can access the photograph bank 8 from the personal computer 4 and can refer to the image data sets S.

In this case, the image data sets Ss stored in the server 22 of the DPE store 2 may be deleted automatically after a predetermined period (such as 2 months) has elapsed.

In the above embodiments, the image data sets S are sent by communication with the DPE store 2 via the mobile phone 3 or the communication terminal 7. However, the communication terminal 13 of the digital camera 1 may be able to communicate with the communication IF 21 of the DPE store 2 so that the image data sets S can be sent directly from the digital camera 1 to the DPE store 2, without involving the mobile phone 3 or the communication terminal 7.

In the embodiments described above, the digital camera 1, the DPE store 2, and the mobile phone 3 or the communication terminal 7 send and receive the image data sets S, the information D and the like by wireless communication. However, the image data sets S and the like may be sent and received via wired communication.

A skilled artisan would know that computer readable media are not limited to any specific type of storage device and includes any kind of device, including but not limited to CDs, floppy discs, RAMs, ROMs, hard discs, magnetic tape, in which computer instructions can be stored and/or transmitted. Additionally, computer instructions include, but are not limited to, source, object, and executable code and can be in any language including higher level languages, assembly language and machine language.

What is claimed is:

1. An image data transfer method for sending image data recorded in a recording medium by a digital camera communicable with data storage means to the data storage means that has a function of remote communication, the image data transfer method comprising:
   adding ID information for identifying an owner of the digital camera to the image data;
   sending the image data added with the ID information to a user directory that corresponds to the ID information in the data storage means;
   receiving a confirmation representing that the image data added with the ID information are stored in the data storage means;
   marking the image data in the recording medium to indicate that the image data are stored in the data storage means, wherein marking the image data comprises turning archive properties of the image data OFF; and
   determining whether an archive property of the image data is set to OFF, and if affirmative, performing a size-reduction processing within the digital camera to generate reduced-sized image data, storing the reduced-sized image data in the recording medium of the digital camera, and deleting the image data corresponding to the reduced-sized image data from the recording medium of the digital camera.

2. The method of claim 1, further comprising:
   issuing a notification that image data transfer is necessary, when there is no more free space within the recording medium or when the amount of free space within the recording medium becomes less than a predetermined amount.

3. The method of claim 1, further comprising:
   transmitting instructions to increase the capacity of the user directory corresponding to the ID information who is sending image data, in the case that the capacity of the storage means is insufficient.

4. The method of claim 1, wherein the user directory uniquely corresponds to the ID information.

5. The method of claim 1, further comprising receiving a selection of the image data to be sent to the user directory and appending the ID information to the selected image data as tag information.

6. The method of claim 1, wherein the ID information is added to the image data so as to unify the ID information with the image data.

7. The method of claim 1, wherein the confirmation is received by the digital camera and the image data in the recording medium are marked therein, indicating that the image data are stored in the data storage means.

8. The method of claim 7, wherein an archive property of the image data in the recording medium is set to OFF in response to the receipt of the confirmation, indicating that the confirmation is received by the digital camera.

9. The method of claim 1, further comprising:
   sending the image data from the data storage means to a personal computer, and
   marking the image data stored in the data storage means to indicate that the transfer of the image data to the personal computer is complete.

10. The method of claim 9, wherein marking the image data in the data storage means comprises turning archive properties of the image data in the data storage means OFF.

11. A digital camera communicable with data storage means that has a remote communication function, the digital camera comprising transfer means for sending image data recorded in a recording medium to the data storage means, wherein
   the transfer means adds ID information for identifying an owner of the digital camera to the image data; sends the image data added with the ID information to a user directory that corresponds to the ID information in the data storage means; and receives a confirmation representing that the image data added with the ID information are stored in the data storage means,
   wherein the transfer means marks the image data in the recording medium to indicate that the image data are stored in the data storage means, wherein marking the image data comprises turning archive properties of the image data OFF; and
   the transfer means determines whether an archive property of the image data is set to OFF, and if affirmative, performs a size-reduction processing within the digital camera to generate reduced-sized image data, stores the reduced-sized image data in the recording medium of the digital camera, and deletes the image data corresponding to the reduced-sized image data from the recording medium of the digital camera.

12. A digital camera of claim 11, wherein the transfer means marks the image data by setting archive properties of the image data OFF each time that a single piece of image data is transferred.

13. A digital camera of claim 11, wherein the transfer means receives information corresponding to comparison results between the size of image data transmitted from the digital camera via a mobile telephone and free space within the user directory corresponding to the ID information, which has been sent prior to the image data, via the mobile telephone.

14. A digital camera of claim 11, further comprising a selection means for receiving a selection, selecting the image data to be sent to the user directory, and the transfer means appends the ID information to the selected image data as tag information.

15. A computer-readable recording medium storing a program that causes a computer to execute an image data transfer method comprising the step of sending image data recorded in a recording medium by a digital camera communicable with data storage means to the data storage means that has a function of remote communication, the program further comprising:
   adding ID information for identifying an owner of the digital camera to the image data;
   sending the image data added with the ID information to a user directory that corresponds to the ID information in the data storage means;
   receiving a confirmation representing that the image data added with the ID information are stored in the data storage means;
   marking the image data in the recording medium to indicate that the image data are stored in the data storage means, wherein marking the image data comprises turning archive properties of the image data OFF; and
   determining whether an archive property of the image data is set to OFF, and if affirmative, performing a size-reduction processing within the digital camera to generate reduced-sized image data, storing the reduced-sized image data in the recording medium of the digital camera, and deleting the image data corresponding to the reduced-sized image data from the recording medium of the digital camera.

16. The computer-readable medium of claim 15, further comprising program means for:

issuing a notification that image data transfer is necessary, when there is no more free space within the recording medium or when the amount of free space within the recording medium becomes less than a predetermined amount.

17. The computer-readable medium of claim 15, further comprising program means for:

transmitting instructions to increase the capacity of the user directory corresponding to the ID information, in the case that the capacity of the storage means is insufficient.

18. The computer-readable recording medium of claim 15, wherein the user directory uniquely corresponds to the ID information.

19. The computer-readable recording medium of claim 15, further comprising receiving a selection of the image data to be sent to the user directory and appending the ID information to the selected image data as tag information.

* * * * *